(12) United States Patent
Deisinger

(10) Patent No.: US 11,333,244 B2
(45) Date of Patent: May 17, 2022

(54) BELLOWS WITH GROOVES

(71) Applicant: GKN Driveline International GmbH, Lohmar (DE)

(72) Inventor: Markus Deisinger, Siegburg (DE)

(73) Assignee: GKN Driveline International GmbH, Lohmar (DE)

(*) Notice: Subject to any disclaimer, the term of this patent is extended or adjusted under 35 U.S.C. 154(b) by 447 days.

(21) Appl. No.: 16/475,772

(22) PCT Filed: Jan. 4, 2018

(86) PCT No.: PCT/EP2018/050179
§ 371 (c)(1),
(2) Date: Jul. 3, 2019

(87) PCT Pub. No.: WO2018/130453
PCT Pub. Date: Jul. 19, 2018

(65) Prior Publication Data
US 2019/0346042 A1    Nov. 14, 2019

(30) Foreign Application Priority Data
Jan. 11, 2017 (DE) ............... 10 2017 100 431.9

(51) Int. Cl.
*F16J 3/04* (2006.01)
*F16D 3/84* (2006.01)

(52) U.S. Cl.
CPC .............. *F16J 3/042* (2013.01); *F16D 3/845* (2013.01)

(58) Field of Classification Search
CPC .................................. F16J 3/042; F16D 3/845

USPC ........................................................ 464/175
See application file for complete search history.

(56) References Cited

U.S. PATENT DOCUMENTS

| 3,688,523 | A  | * | 9/1972 | Schafer | ................... F16D 3/845 |
| | | | | | 464/175 |
| 6,547,669 | B1 | * | 4/2003 | Neviani | ................... F16J 3/042 |
| | | | | | 464/175 |
| 7,056,219 | B2 |   | 6/2006 | Toriumi et al. | |
| 7,326,119 | B2 |   | 2/2008 | Toriumi | |
| 7,967,687 | B2 | * | 6/2011 | Yamamoto | .............. F16D 3/845 |
| | | | | | 464/175 |

(Continued)

FOREIGN PATENT DOCUMENTS

| CN | 101398081 A  | 4/2009 |
| DE | 10131302 A1  | 1/2003 |

(Continued)

OTHER PUBLICATIONS

International Search Report and Written Opinion for PCT/EP2018/050179 dated May 14, 2018 (13 pages; with English translation).

*Primary Examiner* — Greg Binda
(74) *Attorney, Agent, or Firm* — Bejin Bieneman PLC

(57) ABSTRACT

A boot can be fastened to a joint housing with a seal. The boot includes a first and a second fastening region, and a pleated region between them. The first fastening region comprises lobe regions and/or guide regions, and connecting regions and a connector seat region, which comprises at least two grooves in at least the lobe regions and/or the guide regions, starting from the connector seat region surface, said grooves being parabolic when viewed in the cross sections and having different depths inside the lobe regions and/or the guide regions.

13 Claims, 10 Drawing Sheets

(56) References Cited

U.S. PATENT DOCUMENTS

| | | |
|---|---|---|
| 2004/0036231 A1 | 2/2004 | Neviani |
| 2004/0056434 A1 | 3/2004 | Wolf |
| 2004/0164500 A1 | 8/2004 | Devers |
| 2005/0026706 A1 | 2/2005 | Kashiwagi |
| 2006/0125194 A1 | 6/2006 | Toriumi |

FOREIGN PATENT DOCUMENTS

| | | | |
|---|---|---|---|
| DE | 10348372 B4 | 5/2004 | |
| DE | 102004037715 A1 | 2/2006 | |
| EP | 1273834 A2 | 6/2002 | |
| EP | 1182372 B1 | 12/2007 | |
| EP | 2730795 A1 | 5/2014 | |
| FR | 2 572 478 A1 * | 5/1986 | ............... 464/175 |
| JP | S56157465 U | 11/1981 | |
| JP | S58182064 U | 12/1983 | |
| JP | S6216541 Y | 4/1987 | |
| JP | H08232971 A | 9/1996 | |
| JP | H09196187 A | 7/1997 | |
| JP | 200213546 A | 1/2002 | |
| JP | 2002340013 A | 11/2002 | |
| JP | 2004108435 A | 4/2004 | |
| JP | 3572470 B2 | 10/2004 | |
| JP | 200536983 A | 2/2005 | |
| JP | 2009068510 A | 4/2009 | |
| JP | 2010025255 A | 2/2010 | |
| JP | 2010127407 A | 6/2010 | |
| JP | 2011033065 A | 2/2011 | |
| JP | 2013204685 A | 10/2013 | |
| KR | 200258412 Y1 | 12/2001 | |
| KR | 101336503 B1 | 12/2013 | |

\* cited by examiner

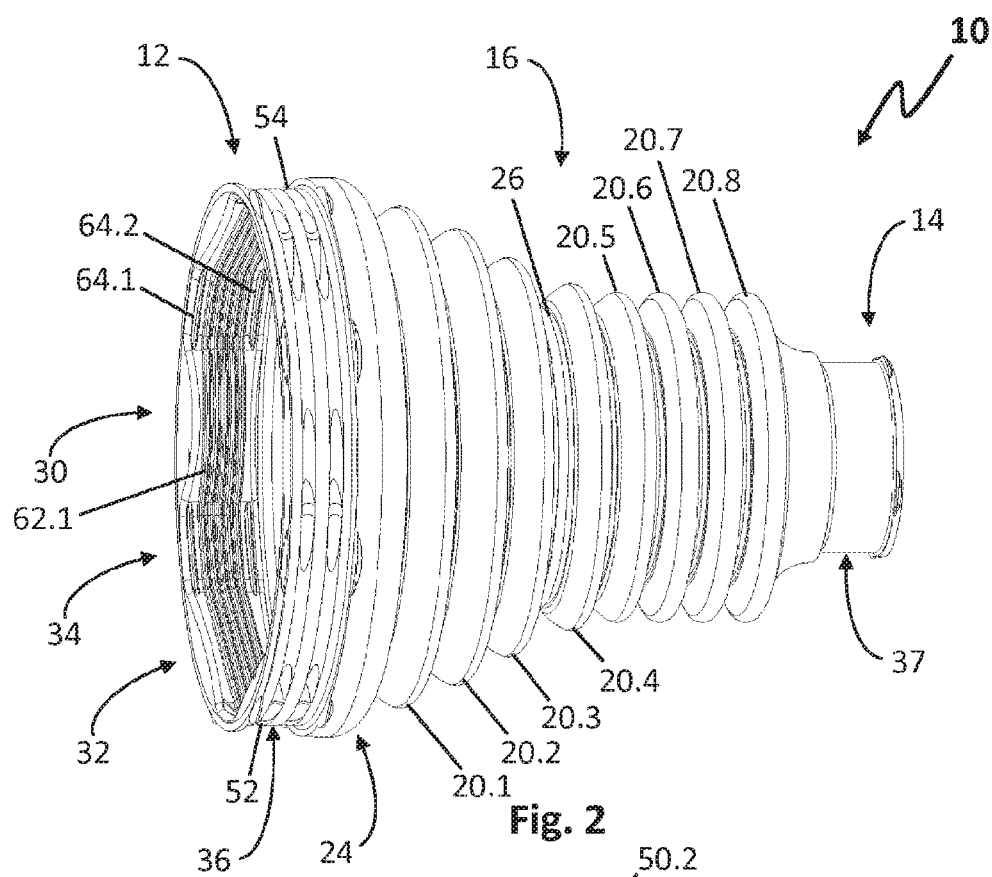
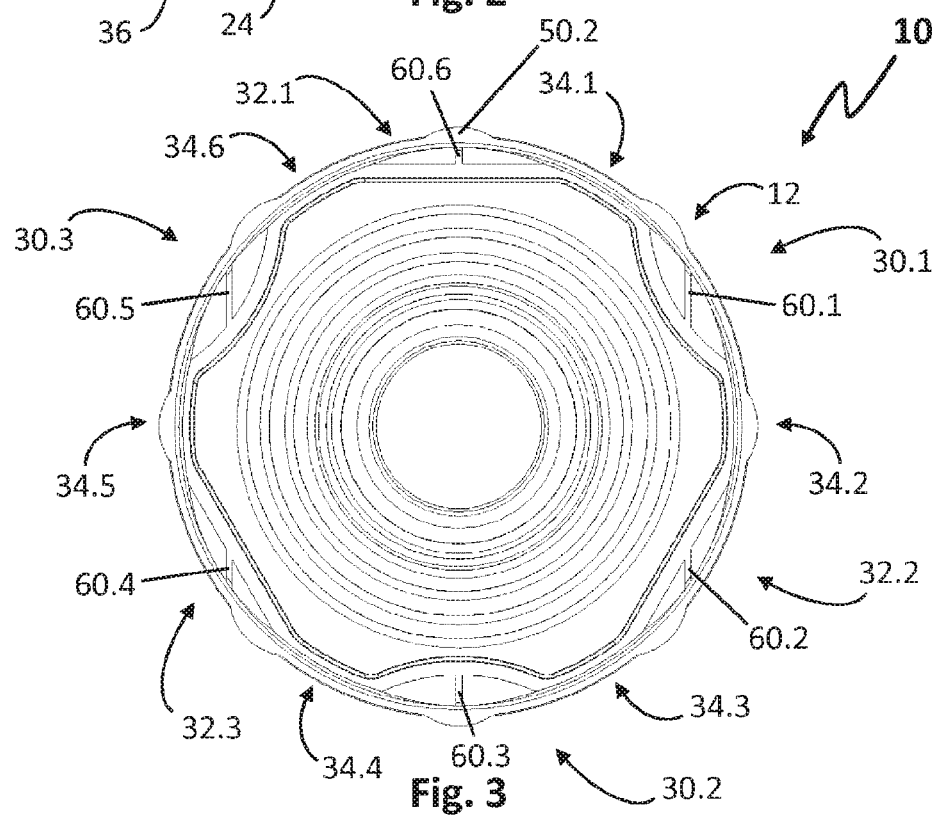

BELLOWS WITH GROOVES

CROSS-REFERENCE TO RELATED APPLICATIONS

This application is a national stage of, and claims priority to, Patent Cooperation Treaty Application No. PCT/EP2018/050179, filed on Jan. 4, 2018, which application claims priority to German Application No. DE 10 2017 100 431.9, filed on Jan. 11, 2017, which applications are hereby incorporated herein by reference in their entireties.

BACKGROUND

Generic boots are used for sealing joint components, in particular in the drive trains of motor vehicles and utility vehicles of any type. Joints in the form of constant-velocity joints in the prior art typically have three radial recesses on their exterior circumference. The outer contour formed in this manner is referred to as having three lobes, and these joints are referred to in general as tri-lobe constant-velocity joints. The object of the boot is to seal the joint region in order to prevent contaminants and moisture from entering the joint, and to prevent grease from escaping.

The sealing effect is also obtained in that the tri-lobe outer contour of the joint housing is formed in the connection region of a boot by providing a thicker material at the corresponding locations. The bulges formed in this manner compensate for the differences in radii in the tri-lobe outer contour of the joint housing when a fastening region is provided that has a constant radius, such that fastening elements such as clamps or tension straps, connectors in general, can be used therewith.

A generic boot is known from EP 1 182 372 B1 that has at least one slot in tri-lobe regions of the fastening region of the fastening element facing a joint housing, which has a circumferential length, and a radial depth that extends substantially through the entire material of the associated tri-lobe region, such that the tri-lobe region is not robust, wherein the at least one slot of the tri-lobe region extends over the circumference of the boot at a spacing to at least one further slot in an adjacent tri-lobe region.

The disadvantage with this known boot from the prior art is that, due to the bulky design of the fastening region, the connector tends to crack when it is fastened in place, or the seal may fail where the boot borders on a circumferential groove on the outside of the joint housing. If there are numerous parallel slots in the tri-lobe regions as described in EP 1 182 372 B1, an exposed rib is formed between them, which tends to bend when a connector is put in place and fastened, if the material is too soft, or, if the material is too hard, may break the connector when fastening it.

SUMMARY

The present disclosure relates to a boot that has a first fastening region and a second fastening region, and a pleated region between them, wherein the first fastening region comprises lobe regions and/or guide regions and connecting regions and a connector seat region, and a use of the boot, as well as a joint-shaft connection that comprises the boot. The boot can be placed on a joint housing that has a tri-lobe outer contour.

In a boot the first fastening region, starting from a connector seat region, comprises at least two grooves in the lobe regions and/or guide regions, possibly in all lobe regions and/or guide regions, that have a parabolic cross section, which can be substantially parallel to one another, and exhibit different, or varying depths in the lobe regions and/or the guide regions. In contrast, the depth can, and advantageously does, remain constant, i.e., does not vary, in the connecting regions. It has been determined that by providing at least two, possibly parallel grooves in the lobe regions and/or in the guide regions, breakage problems, as well as sealing problems in connectors that are inserted therein, are advantageously avoided, when the grooves have a substantially parabolic cross section through the boot.

In an example, boots can have three lobe regions, for example, and three connecting regions that connect them, but no guide regions. In an alternative example, the boot can also have three lobe regions and three guide regions, e.g., in an alternating sequence, which are connected to one another via six connecting regions.

The lobe regions of the first fastening region of the boot have the material reinforcements on the undersurface thereof, with a radial contour that is adapted to the recesses (radial indentations) formed on the tri-lobe joint housing, which run toward a shaft. The guide regions also have material reinforcements on the inner surface of the first fastening region facing the joint housing, but these reinforcements have a linear contour. The first fastening region has a thinner, preferably constant, material thickness in the connecting regions than in the lobe regions and/or the guide regions.

Parabolic grooves as set forth in the present disclosure are grooves that have a parabolic cross section, in the mathematical sense, through the boot, that runs through a plane that runs along the first and second connecting regions, and through a central axis of the boot. This means that the shape of the grooves in the boot according to the disclosure is characterized as a section of a straight circular cone in a plane that is parallel to a surface line and does not intersect the tip of the cone. The grooves in the boot according to the disclosure have a radial inner wall. The opposing walls of the inner wall are substantially mirror symmetrical with respect to a plane that is perpendicular to the aforementioned plane, running though the base of the grooves. The groove base itself is not flat, but instead exhibits only radial sections. In particular, the groove base contains no regions that are substantially parallel to the connector seat region surface and the opposing undersurface of the first fastening region. The exception is a tangent to the bases of the grooves.

The at least two grooves can be substantially parallel to one another, and can be the same length in the lobe regions and/or the guide regions, such that they do not form circumferential annular grooves. As set forth in the present disclosure, there can be not just two, but also three, four, or more such grooves. At least two of these grooves have a parabolic cross section in this case, and possibly all of the grooves in the connector seat region of the first fastening region are located there, starting from the connector seat region surface, i.e., they open toward the connector seat region surface of the connector seat region of the first fastening region.

In an example, the at least two grooves of the boot according to the disclosure form annular grooves. The annular grooves have a limited, possibly constant, i.e., not varying, depth in the connecting regions. The grooves are located in the lobe regions and/or the guide regions, possibly in all of the lobe regions and/or guide regions. Alternatively, the at least two grooves are formed as groove segments in the lobe regions and/or the guide regions. In this case, the two grooves are not circumferential, but are formed instead as groove segments, which run in a common plane, successively along the circumference of the first fastening region. The connecting regions possibly have no grooves. The lobe regions and the guide regions, if there are any, have the at least two parabolic grooves or groove segments. Alternatively, with a boot that has both lobe regions and guide regions, the at least two parabolic grooves or groove segments can be provided in only the lobe regions or the guide regions, or in both the lobe regions and the guide regions. If the boot only has lobe regions, but no guide regions, the at least two parabolic grooves or groove segments are located in the lobe regions, and also form annular grooves, wherein they then possibly have a different depth in the connecting regions.

The pleated region of the boot according to the disclosure can have at least one pleat, which has a pleat crest and a pleat trough facing the first fastening region and a pleat trough facing the second fastening region, wherein there is typically at least one further pleat following the pleat trough facing the second fastening region. The pleated region can have a number of pleats, e.g., two, three, four, five, six, seven, eight, or more. The pleats in the pleated region can have diameters that decrease from the first connector seat region to the second connector seat region, and they may have sections with the same diameter. By way of example, there can be one to three pleats with decreasing diameters toward the second connector seat region with respect to the pleat peaks thereof, followed by two to four pleats with the same diameter with respect to the pleat peaks, after which there are one to three pleats with diameters that decrease toward the second fastening region with respect to their pleat peaks. Any other configuration of the pleated region is also possible. The pleat troughs can be in any form, e.g. they can be subdivided by material reinforcements or reductions in material in order to modify the flexibility of the boot with regard to special requirements for the boot.

A substantial advantage of the design of the boot according to the disclosure that has two parabolic, possibly substantially parallel grooves with varying depths in the lobe regions and/or the guide regions, is that forces acting on the first connector seat region can be transferred evenly in this manner, due in particular to the parabolic design of the grooves. Furthermore, the material thickness in the first connector seat region can be more evenly distributed in the lobe regions and the guide regions, which ultimately prevents a breaking of the connector when it is fastened down.

Different or varying depths with respect to the at least two grooves is understood to mean, as set forth in the present disclosure, that the depth of a groove increases inside the lobe regions and/or the guide regions from an end of a lobe region or a guide region to the middle of the lobe region or the guide region, and then decreases again, seen along the circumference of the first fastening region. The decrease and increase can be constant. The groove base possibly has no rises or depressions, and instead is flat. The thickness of the material in the first fastening region beneath the groove bases of the at least two grooves is substantially the same in the lobe regions and/or the guide regions. The thickness of the material in the first fastening region beneath the groove base is determined by the distance between the groove base, or a tangent thereto, and an undersurface of the first fastening region. The undersurface is located opposite the connector seat region surface. This does not take into account any sealing lips or positioning ribs that may be located on this undersurface, as shall be explained below.

The material of the connector seat region located between the at least two grooves possibly has a thickness $D_a$ at half the depth of the grooves in the lobe regions and/or the guide regions that corresponds to approximately 85% to 115%, possibly approximately 90% to 110%, and possibly approximately 93% to 106%, of a thickness $D_b$ determined between an outer wall and an inner wall of the first connector seat region and the respective groove wall facing it on the at least two grooves adjacent to the outer wall and the inner wall, at half the depth. Insofar as the term "approximately" is used with regard to values, value ranges, or terms referring to values, this is to be understood to mean that which a person skilled in the art would regard as typical from a professional perspective in the given context. In particular, deviations from the given value, range of values, or terms referring to values, of ±10%, possibly ±5%, more possibly ±2%, are comprised in the term "approximately"

A substantially constant material thickness in the regions at half the depth results in a homogenous distribution of force when fastening a connector thereto, and also prevents a possible bending away of the material located between two grooves, as is known from the prior art. The parabolic design of the grooves also contributes to this such that the material between two grooves is distributed in the region of the groove bases starting from the connector seat region surface or the undersurface of the first connector seat region. This material can be referred to as having a ribbed design.

In another example of the boot, there are reinforcement ribs in the grooves in the lobe regions and/or the guide regions. These reinforcement ribs are used to stabilize the material in the first fastening region because of the greater depths of the at least two grooves in the lobe regions in particular. As a result, the material between the at least two grooves, which is ribbed in particular, is prevented specifically from bending. The reinforcement ribs possibly engage in the opposing groove walls, and can be connected thereto in an integral manner. The height of the reinforcement ribs is also possibly no greater than the depths of the respective grooves. The reinforcement ribs possibly extend from the groove base to the connector seat region surface, but they can also end somewhat below the connector seat region surface. In an example, at least one of the reinforcement ribs has a radial orientation. A radial orientation means that these reinforcement ribs are substantially straight, running from the first fastening region in the direction of an imaginary central axis of the boot according to the disclosure. In another example, at least one of the reinforcement ribs runs at an angle to a radial orientation. This means that a line passing through this other angled reinforcement rib, which is straight, does not pass through the center of the boot, through which the imaginary main axis of the boot runs. The boot according to the disclosure possibly has at least two reinforcement ribs that have radial orientations, wherein one radial reinforcement rib is possibly located in a lobe region and another reinforcement rib is possibly located in a guide region, wherein it is also preferred that the lobe region and the guide region with the radial reinforcement ribs lie opposite one another. The other two lobe regions and guide regions have angled reinforcement ribs, which also possibly do not intersect in their straight extensions, but instead have designs that differ from one another. As a result, the opposing lobe regions and guide regions can have identical pairs of angles. The angles can be in a range of approximately 35° to 80°, more possibly in a region of approximately 40° to 78°, with respect to a radial that connects the imaginary main axis passing through the center of the boot to the first fastening region by the shortest path.

In another example, a thickness $S1$, $S2$ of the material in the first fastening region beneath the at least two grooves is substantially uniform in the lobe regions and/or in the guide regions, starting from the groove base thereof. As a result, the material of the first fastening region beneath the grooves in the lobe regions and in the guide regions advantageously behaves substantially in a uniform manner when subjected to forces by closing a connector, i.e., a homogenous behavior can be obtained in the lobe regions and/or the guide regions, both of which have a greater material thickness than the connecting regions. "Substantially" means that the respective material thicknesses in the lobe regions and/or the guide regions deviate from one another no more than approximately ±20%, possibly no more than approximately ±10%, and more possibly no more than approximately ±2%.

In another example, there are two sealing lips on the undersurface of the first fastening region facing away from the connector seat region surface. Possibly, there are at least three, at least four, at least five, at least six, or more sealing lips. The sealing lips possibly form circumferential annular lips. The sealing lips are substantially parallel to one another. The sealing lips also possibly have a substantially identical cross section seen along a plane passing through the main axis of the boot, which connects the first fastening region and the second fastening region. The cross section is particularly possibly triangular, but can also be semicircular, or have other radial regions. If the cross section is basically triangular, the apex of the triangle, which is oriented toward an imaginary surface of a joint groove, is somewhat rounded. Adjacent sealing lips are substantially the same height, starting from the undersurface of the first fastening region.

In an example, the sealing lips are substantially located inside the region defined by the at least two grooves in the lobe regions and the guide regions. This region defined by the grooves is defined by that width of the connector seat region surface that extends from the groove wall adjacent to an outer wall of the first fastening region to the groove wall of the subsequent groove facing an inner wall of the first fastening region. The sealing lips can be located precisely beneath a groove base of one of the grooves, or they can be offset in pairs along the circumference, on both sides of the groove base. Sealing lips, possibly precisely one, can also be provided in the region between two grooves where material is accumulated, typically in the form of ribs.

In another example, two positioning ribs are located in the connecting regions of the first fastening region, on its undersurface. The at least two sealing lips can be located between the positioning ribs. The two positioning ribs can be spaced apart at a distance that corresponds substantially to the joint groove on a joint housing on which the boot is located. The two positioning ribs can be located exclusively in the connecting regions. These possibly also have a length that substantially corresponds to a radial extension of the guide region, or is slightly shorter than this radial extension. As a result of the two positioning ribs, which encompass both of sealing lips on both sides in a cross section that passes through the imaginary main axis of the boot, and comprises a plane between the first fastening region and the second fastening region, further positioning aids, which are often provided in the transition from the first fastening region to the pleated region, become superfluous. Advantageously, a first pleat in the pleated region, which is adjacent to the first fastening region, can have a greater diameter with respect to the crest of the pleat.

The cross section profiles of the sealing lips also possibly differ from those of the positioning ribs. The cross section profile is in relation to a plane running through the first fastening region and the second fastening region, which intersects the imaginary main axis of the boot according to the disclosure. In differing from the cross section profile described above, the positioning ribs possibly have a substantially triangular shape. The base of the triangle, which is located on the undersurface of the first fastening region, is possibly wider than the base of the sealing lips. The height of the positioning ribs is also possibly somewhat less than the height of the sealing lips. The positioning ribs can be located outside the region defined by the at least two grooves, and are therefore not beneath them, as is the case with the sealing lips.

The present disclosure also relates to a boot of the type specified in the introduction, in which there are two positioning ribs located in the connecting regions, between which at least two sealing lips are located, which encompass an undersurface of the first fastening region. The two positioning ribs are advantageously designed in the manner described above. In another example of such an alternative boot, they exhibit one of the other designs described above, in particular two parabolic grooves in at least the lobe regions and/or the guide regions, and those designs associated therewith, as well as those for the first connector seat region. This alternative boot also possibly comprises the at least two sealing lips, as described above.

The present disclosure also relates to the use of a boot, as defined above, for sealing a joint-shaft connection, possibly a constant-velocity joint. The present disclosure also relates to a joint-shaft connection that has a boot as described above. The joint-shaft connection is possibly a constant-velocity joint. The boot according to the disclosure can be pre-assembled thereon, wherein the connector, which is already located in the first fastening region, is not yet tightened. The inner contour of the boot is possibly adapted to the outer contour of the joint housing in the joint-shaft connection. The first region of the boot interacts in particular with a circumferential joint groove on the outside of the joint housing located in the proximity of the edge of the joint housing.

BRIEF SUMMARY OF THE DRAWINGS

These and other advantages shall be explained below in greater detail based on the following figures. Therein:

FIG. 2: shows a rotated perspective view of the boot according to FIG. 1;

FIG. 3: shows a sectional view through a groove base of a groove in the boot of FIG. 1;

DESCRIPTION

Figure 1:
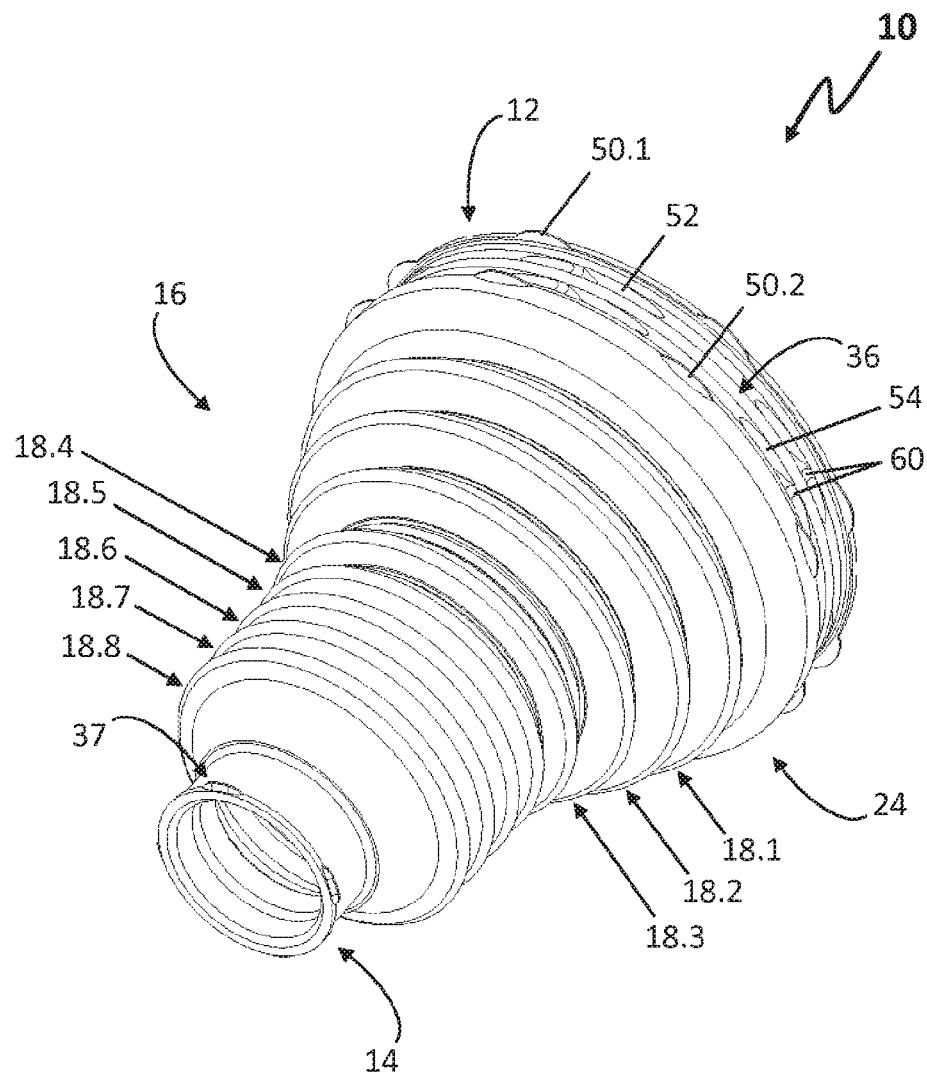
FIG. 1: shows a perspective view of a first example of a boot.

It should first be noted that the examples shown in the figures are not to be regarded as limiting. On the contrary, the features described in reference thereto can be combined with one another and with previously described features to obtain further designs. By way of example, there can also be more or fewer than a total of five sealing lips 62.1 to 62.5 on an undersurface 40 of a first fastening region 12. There can also be more than two parabolic grooves 52 and 54, e.g. three or four. The parabolic shape of the grooves 52 and 54 can also differ from that in the figures. There can also be no circumferential grooves 52 and 54, such that there are no grooves 52 and 54 in the connection regions 34. In this case, the groove segments of the grooves 52 and 54 are only located in the lobe regions 30 and the guide regions 32. The boot 10 can also have only three lobe regions 30 and three connecting regions 34, but no guide regions 32. The boot 10 can also have more or fewer pleats 18 in its pleated region, or it can have pleats 18 with a different shape, in particular pleats 18 that have a decreasing diameter toward the second fastening region 14. Furthermore, there do not need to be any positioning ribs 64.1 and 64.2. Lastly, it should be noted that the reference symbols used in the descriptions of the figures and in the claims do not limit the scope of protection of the present invention, but only refer to the examples shown in the figures. There can be a material accumulation 26, but this need not necessarily be the case.

FIG. 1 shows a boot, indicated as a whole with the reference symbol 10, in a first example, which has a first fastening region 12, a second fastening region 14, and a pleated region 16 that has eight pleats 18.1 to 18.8 between them. There is a transition region 24 between the first fastening region 12 and the pleated region 16. There are two parallel circumferential grooves 52 and 54 in the first fastening region 12, which has a first connector seat region 36. The second fastening region 14 has a second connector seat region 37. There are reinforcement ribs 60 in the grooves 52 and 54 in the guide regions and lobe regions, not numbered here, of the boot 10.

FIG. 2 shows the boot 10 of the first example according to FIG. 1, in a rotated view, in which the design of the first fastening region 12 can been seen in greater detail. The first fastening region 12 contains the lobe regions 30, guide regions 32, and connecting regions 34 between the lobe regions 30 and the guide regions 32. There are a total of five parallel circumferential sealing lips on an undersurface 40 of the first fastening region 12, of which only the sealing lip 62.1 is indicated. There are also two positioning ribs 64.1 and 64.2 in the connecting region 34, between which the sealing lips 62.1 to 62.5 are located. The positioning ribs 64.1 and 64.2 are substantially parallel to the sealing lips 62.1 to 62.5. The connector seat region 36 with its connector seat region surface 38, toward which the grooves 52 and 54 open, is located opposite the undersurface 40 of the first fastening region 12.

FIG. 3 shows the first example of the boot 10 according to FIG. 1 in the form of a section through a first groove base of one of the two grooves 52 and 54 according to FIG. 1, showing the location of the reinforcement ribs 60.1 to 60.6 in the grooves 52 and 54. FIG. 3 shows all three of the lobe regions 30.1, 30.2 and 30.3, as well as the three guide regions 32.1, 32.2, and 32.3, in detail, wherein these are each connected to one another by connecting regions 34.1 to 34.6. The material in the first connector seat region 12 is somewhat thinner in the area of the connecting regions 34.1 to 34.6, and it is substantially identical in the lobe regions 30.1 to 30.3 and the guide regions 32.1 to 32.3. Lug-shaped projections 50.2 can also be readily seen in FIG. 3, as well as in FIG. 1. Lug-shaped projections 50.1 can also be located opposite these lug-shaped projections 50.2 in the edge region of the first fastening region 12, but offset thereto (see FIG. 1). The lug-shaped projections 50.1 and 50.2 facilitate the positioning of a connector, not shown here (see FIG. 9b) in the first fastening region 12. The reinforcement ribs 60.1, 60.2, 60.4 and 60.5 are formed at an angle to a radial orientation of the boot 10. In contrast, there are reinforcement ribs 60.3 and 60.6 in the lobe region 30.2 and guide region 32.1 that have a radial orientation.

Figure 4:
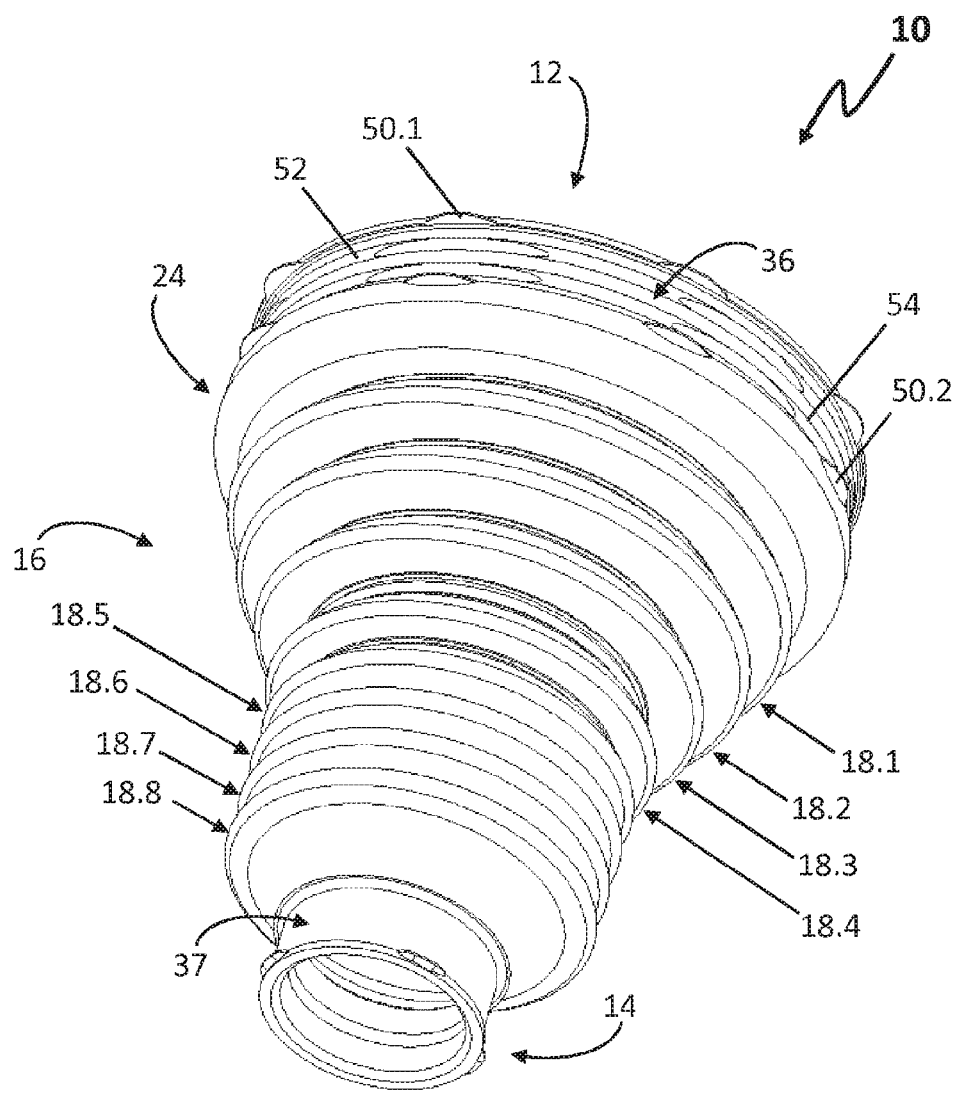
FIG. 4: shows a perspective view of a second example of a boot according to the disclosure.

FIG. 4 shows a boot 10 in a second example, which only differs from that of the first example according to FIG. 1 to FIG. 3 in that there are no reinforcement ribs in the grooves 52 and 54 in the lobe regions and the guide regions. This is particularly clear from the sectional view according to FIG. 5 through either of the grooves 52 or 54 shown in FIG. 4. In contrast to FIG. 3, no reinforcement ribs 60 (see FIG. 3) are visible. Otherwise, the design of this boot 10 according to the second example corresponds in this sectional view according to FIG. 5 to that in FIG. 3.

Figure 6:
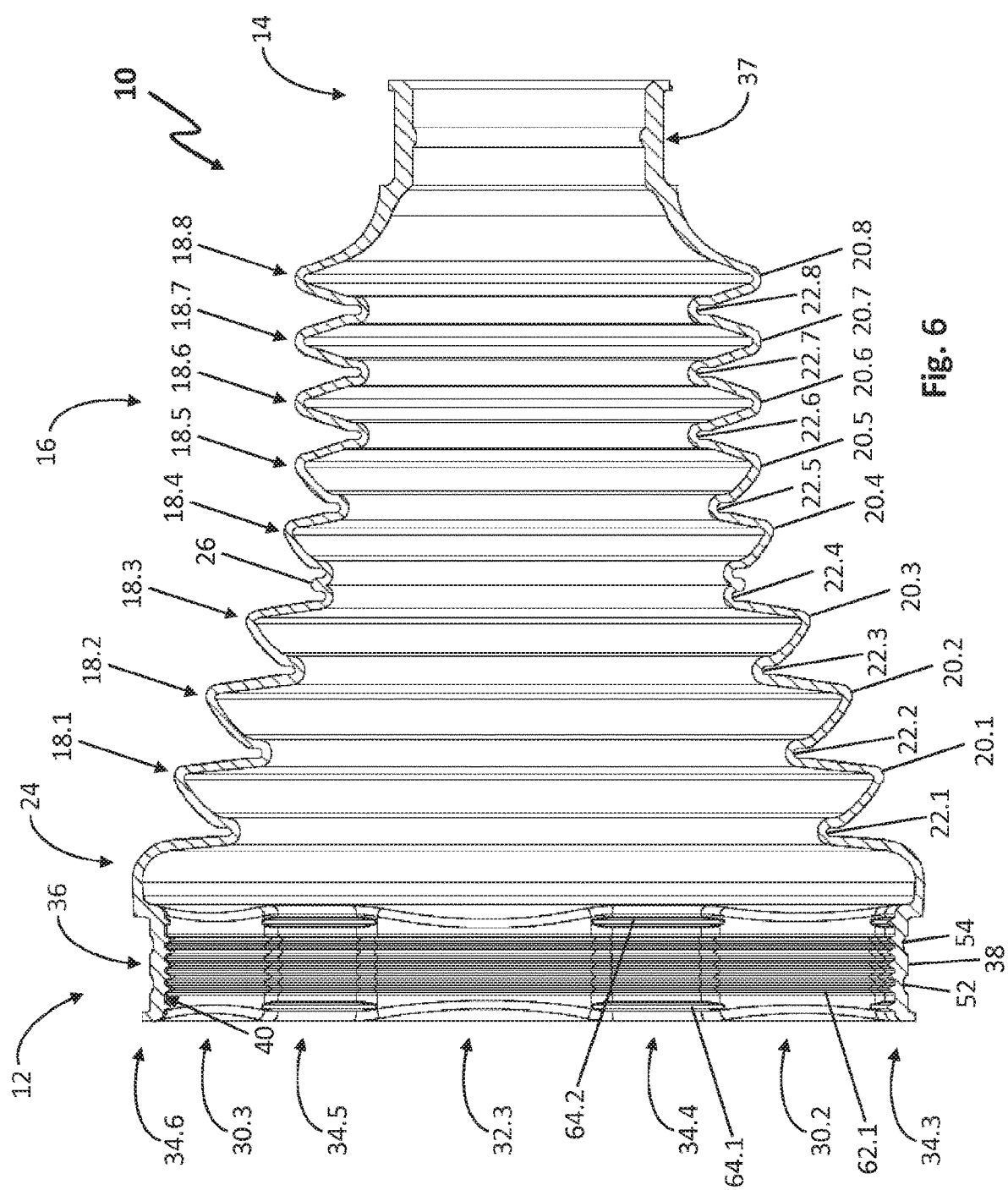
FIG. 6: shows a sectional view cut along the section I-I shown in FIG. 5, but still showing the entire first connector seat region 12.

FIG. 6 shows a sectional view through the boot 10 of the second example, along a section I-I, with the first connecting region 12 shown in its entirety. The design of the boot 16 with its eight pleats 18.1 to 18.8 can be readily seen, wherein the pleats 18.5 to 18.8 have substantially the same diameter, while the pleats 18.1 to 18.4 have decreasing diameters toward the second fasting region 14 with its connector seat region 37. There is a material accumulation 26 in the pleat part 22.4 between the pleats 18.3 and 18.4, which is also the case in the first example (see FIG. 2), which has an effect on the bending behavior of the boot 10. The transition region 24 transitions smoothly into a pleat trough 22.1, without a bulge or pleat crest. The section I-I passes through the connecting regions 34.3 and 34.6. A lobe regions 32.2 adjoins the connecting region 34.3, which is connected in turn to the guide region 32.3 via a connecting region 34.4. The guide region 34.3 in turn is connected to a lobe region 30.3 via the guide region 34.5. All of the guide regions contain the positioning ribs 64.1 and 64.2, as has been described above in conjunction with FIG. 2. As with the first example, there are five parallel, circumferential annular sealing lips 62, which are formed on an undersurface 40 of the first fastening region 40. Only the first sealing lip 62.1 is indicated therein.

The two grooves 52 and 54, which open toward a connector seat surface 38, form annular grooves in this second example, as is also the case in the first example, and exhibit a shallow, constant depth in the connecting regions 34.3 and 34.6.

Figure 5:
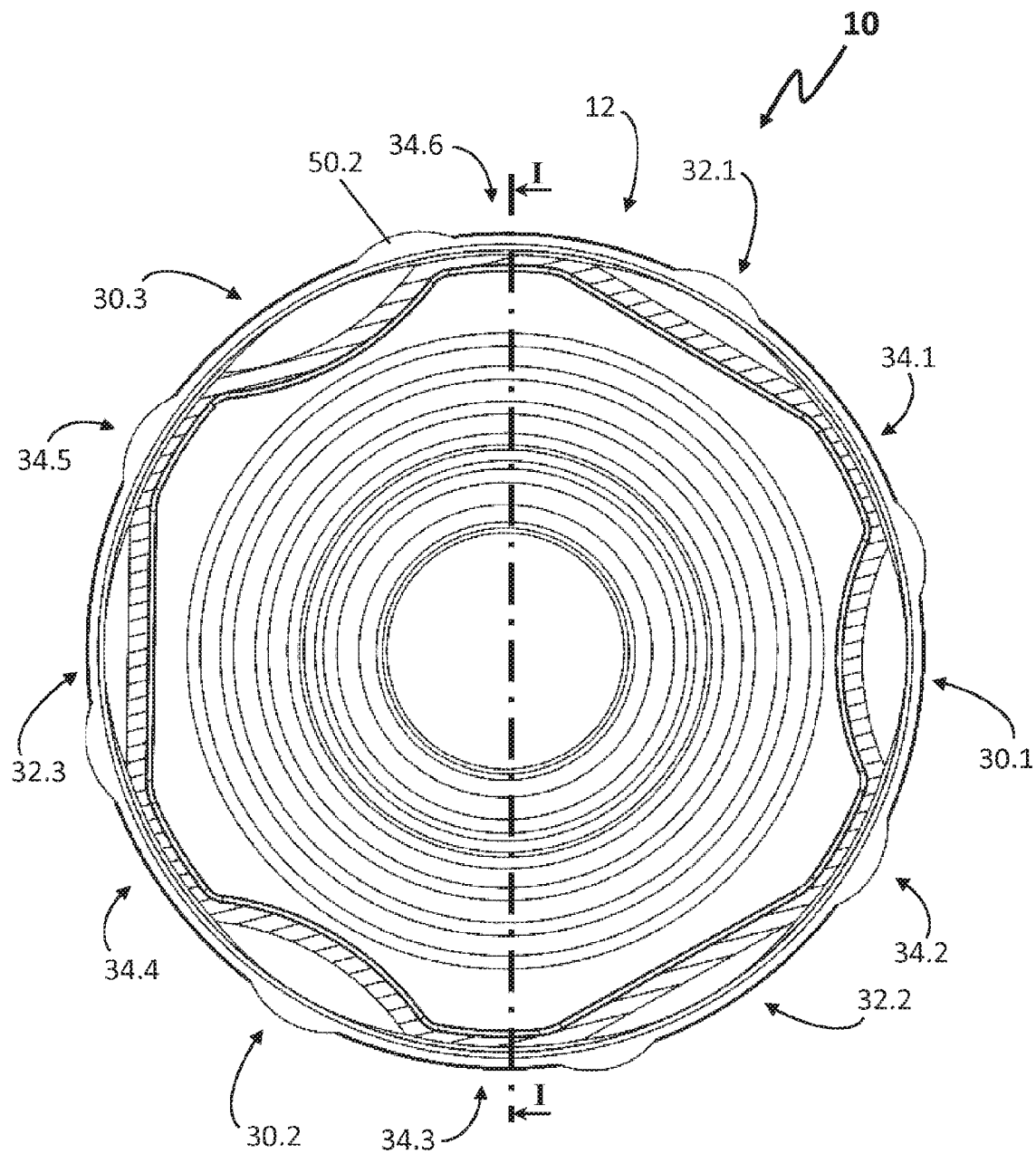
FIG. 5: shows a cross section through a groove base of a groove in a boot according to FIG. 4, with a section I-I indicated through two connecting regions.
Figure 7:
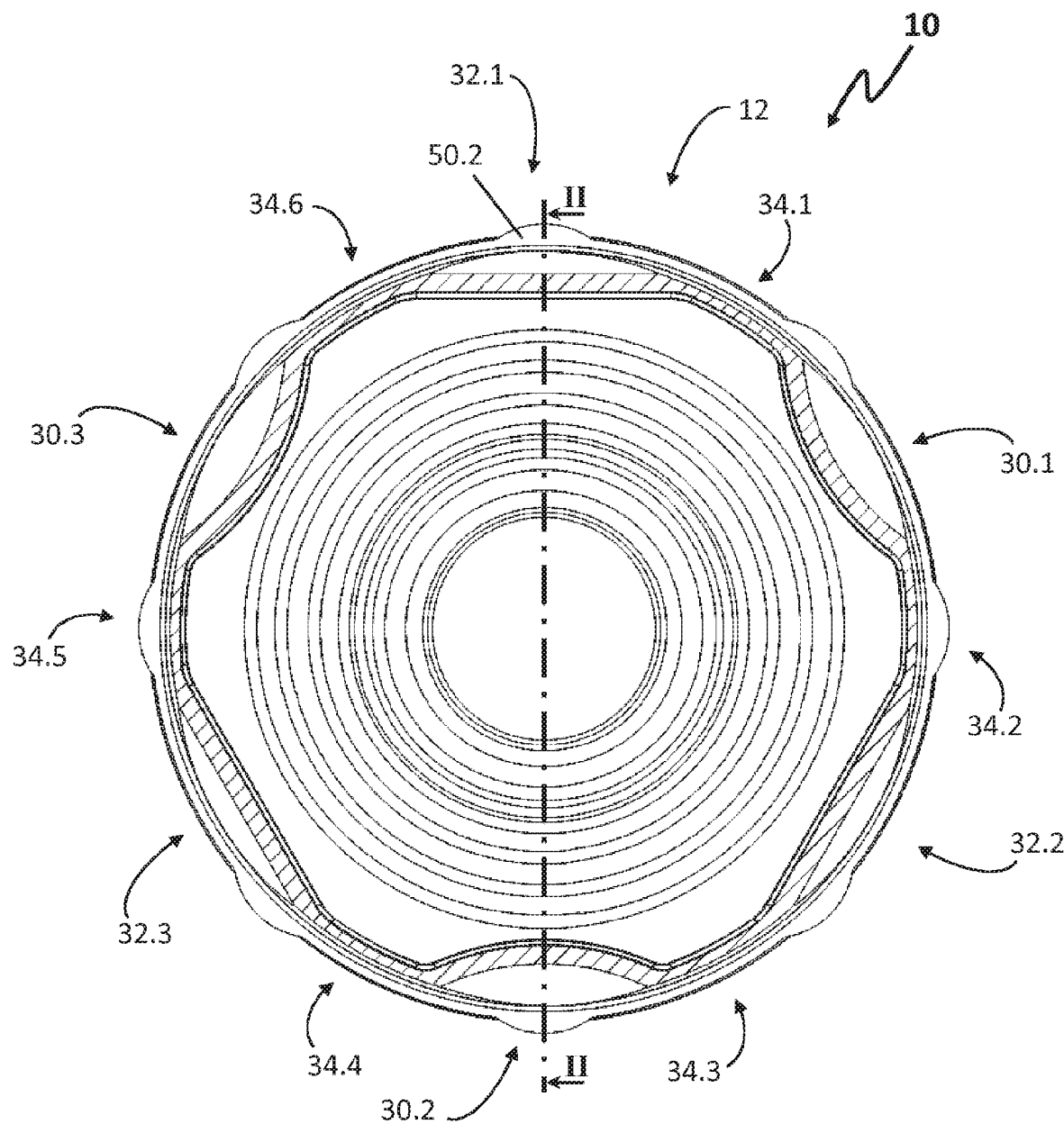
FIG. 7: shows a sectional view through a groove base of a groove in the boot according to FIG. 4, with a section II-II through a guide section and a lobe section.

FIG. 7 shows a sectional view in accordance with FIG. 5, but rotated such that the guide region 32.1 is on top, and the lobe region 30.2 is on the bottom. A section II-II is indicated.

Figure 8:
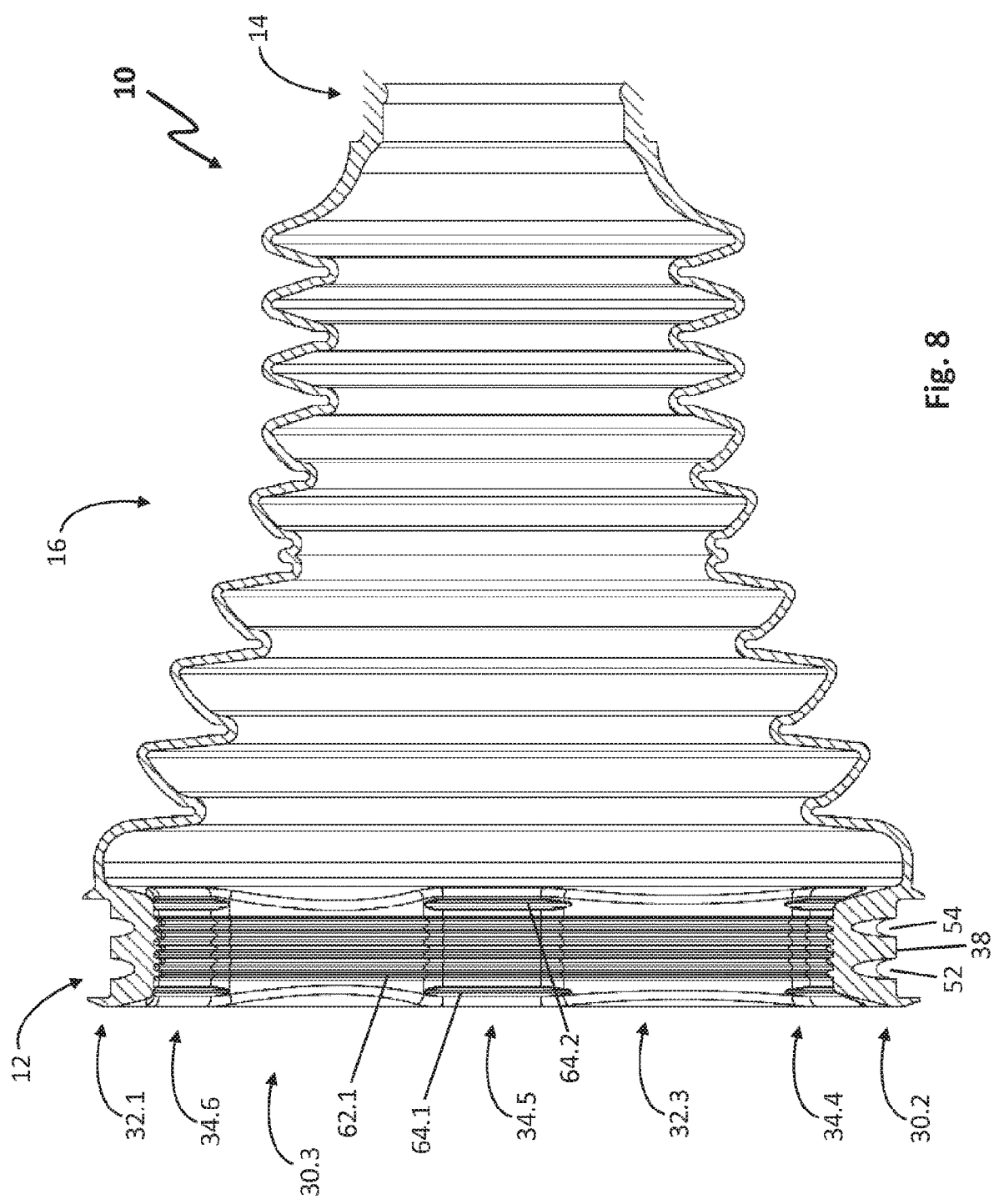
FIG. 8: shows a sectional view along to the section II-II in FIG. 7, but still showing the entire connector seat region 12.

This section II-II can be seen in FIG. 8, wherein, however, the entire first fastening region 12 is shown in this case. The guide region 32.1 is connected to the lobe region 30.3 via the connecting region 34.6. The guide region 32.3 is connected to the lobe region 30.3 via the connecting region 34.5. The lobe region 30.2 is connected to the guide region 32.3 via the connecting region 34.4. The grooves 52 and 54 have a parabolic design with varying depths, wherein there is a shallower maximum depth between that connector seat region surface 38 and a groove base in the guide region 32.1 than in the lobe region 30.2. The design of the lobe region 30.2 and the guide region 32.1 is explained in greater detail below in reference to FIGS. 9a to 10.

Figure 9A:
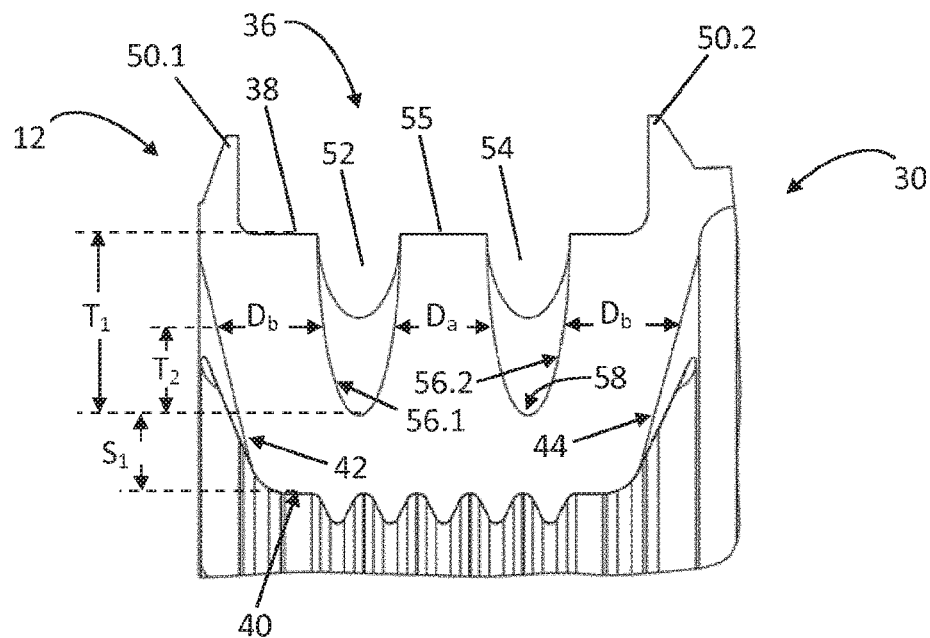
FIG. 9a: shows a cross section through a lobe region of a boot according to FIG. 7 and FIG. 8.
Figure 9B:
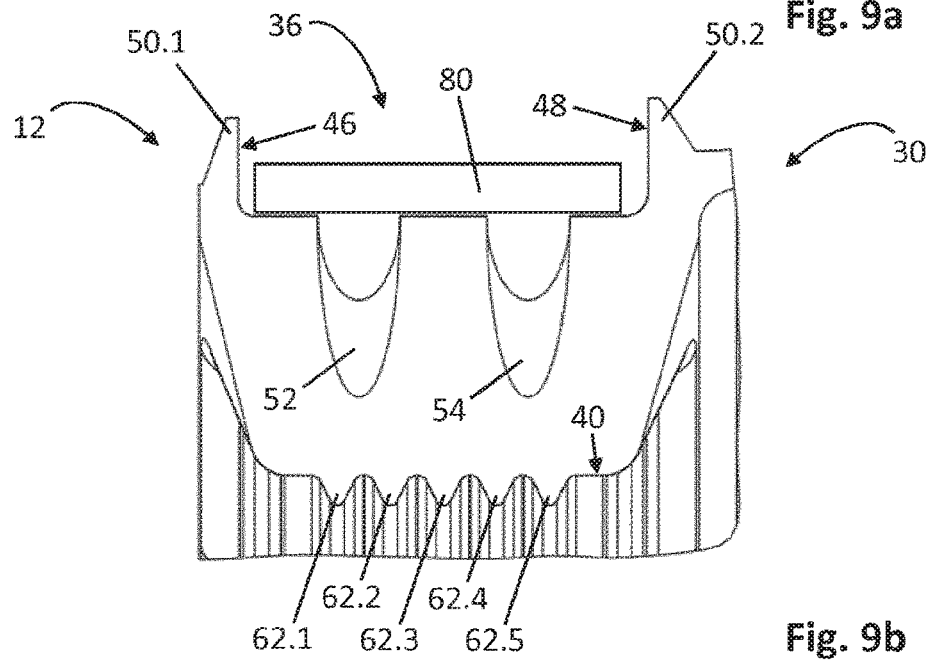
FIG. 9b: shows the cross section through the lobe region according to FIG. 7 and FIG. 8, with the connector mounted thereon.

FIGS. 9a and 9b show a cross sectional view through a lobe region 30 of the boot according to the second example shown in FIG. 7 and FIG. 8. This shows a cross section through a plane that runs through the imaginary main axis of the boot 10 and passes through the second fastening region 14, not shown here (see FIGS. 4, 6 or FIG. 8) in the area of a lobe region 30. The first fastening region 12 comprises, in addition to the connector seat region surface 38 in the connector seat region 36 and the undersurface 40 of an outer wall 42 and an inner wall 44 lying opposite it, wherein the inner wall 44 faces the pleated region 16 (not shown here), while the outer wall 42 faces toward a joint housing, not shown. The two grooves 52 and 54 have a parabolic cross section with a maximum depth T1. Starting from this, a half depth T2 is indicated between a tangent to the groove base 58 and the connector seat region surface 38, which is parallel thereto. A thickness $D_a$ of a rib-shaped material 55 between the two grooves 52 and 54 can be determined at half the depth T2, wherein this thickness $D_a$ is substantially the same as, i.e., that corresponds to approximately 85% to 115%, possibly approximately 90% to 110%, and possibly approximately 93% to 106%, of, a thickness $D_b$ between the outer wall 42 and an adjacent groove wall 56.1, as well as between the inner wall 44 and an adjacent groove wall 56.2. A thickness $S_1$ can be determined between the groove base 58, or a tangent thereto that is parallel to the undersurface of the first fastening region 12 and the plane of this undersurface 40. As shall be explained below, this thickness $S_1$ is substantially identical to a thickness S2 that can be determined in the guide region 32 (see FIG. 10).

A total of five sealing lips 62.1 to 62.5 can be readily seen (FIG. 9b) on the undersurface 40, which have a substantially triangular cross section with rounded peaks facing away from the undersurface 40. All of these sealing lips 62.1 to 62.5 lie within the region spanned by the grooves 52 and 54 on the connector seat region surface 38. The connector seat region 36 itself is delimited by an outer boundary wall 46 and an inner boundary wall 48. FIG. 9b shows the location of a connector 80 in the first fastening region 12. The forces generated by the connector 80 are transferred evenly into the material of the lobe regions 30 of the first fastening region 12, by means of which a good seal can be obtained in the boundary surface to the circumferential joint groove located in the joint housing, not shown, via the sealing lips 62.1 to 62.5.

Figure 10:
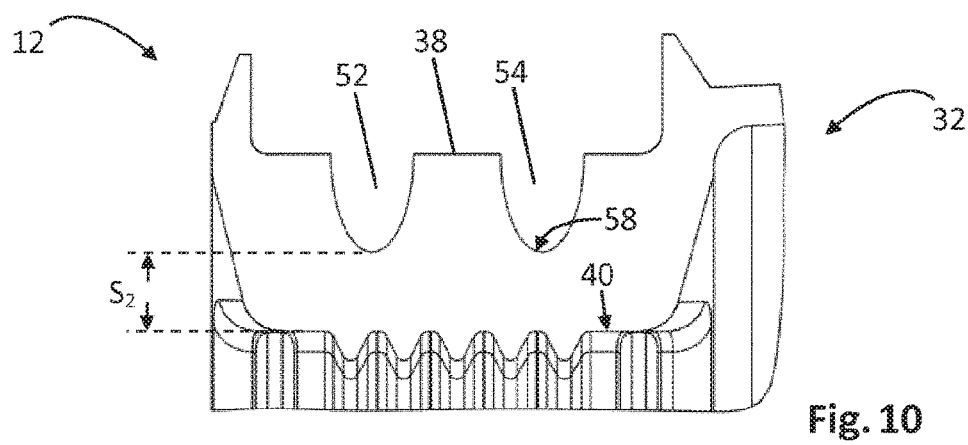
FIG. 10: shows a cross section through a guide section of the boot according to FIG. 7 and FIG. 8.

FIG. 10 shows a cross section, corresponding to FIGS. 9a and 9b, through the guide region 32, corresponding to FIG. 7 and FIG. 8, which has the thickness $S_2$ that substantially corresponds to the thickness $S_1$ of the lobe region in FIGS. 9a and 9b. It can also be seen that the grooves 52 and 54 in this region are shallower than in the lobe region 30 shown in FIGS. 9a and 9b, wherein an opening of the grooves 52 and 54 toward the connector seat region surface 38 is identical, however, and the widths of the openings of the grooves 52 and 54 in the lobe region 30 and the guide region 32, as well as the connecting region 34 (see FIG. 11 and FIG. 12), are identical.

Figure 11:
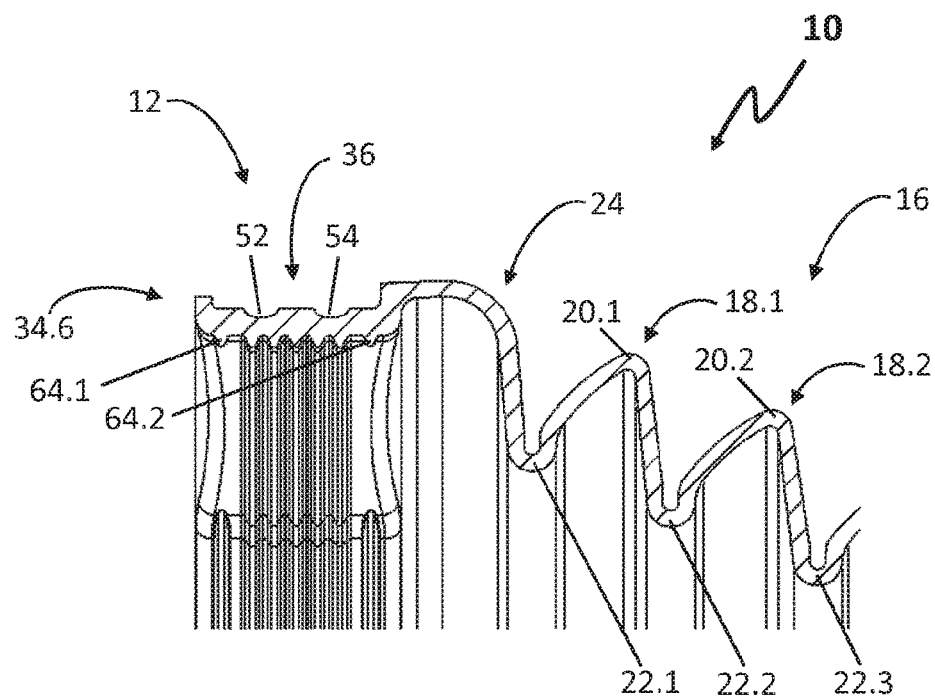
FIG. 11: shows a cross section through a connecting region of the boot according to FIG. 5 and FIG. 6, as well as through a portion of the pleated region.
Figure 12:
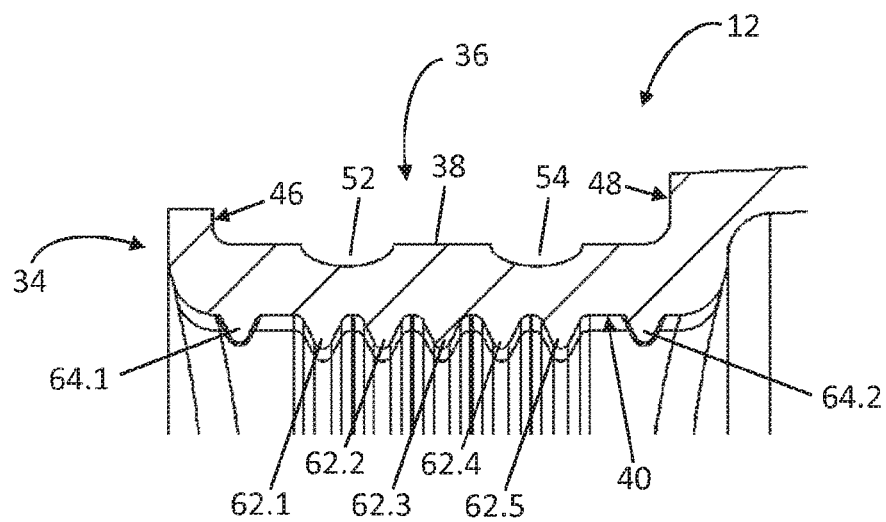
FIG. 12: shows a cross section through a connecting region of the boot according to FIG. 5 and FIG. 6.

FIG. 11 shows a cross section corresponding to FIGS. 9a and 9b, through the connecting region 34.6 shown in FIG. 5 and FIG. 6, together with the adjacent portion of the pleated region 16 that has the pleats 18.1 and 18.2. The pleat 18.1 has a first pleat trough 22.1 between the transition region 24 and a pleat crest 20.1, and a second pleat trough 22.2 between the second pleat crest 20.2 and the pleat crest 20.1, wherein the pleat trough 22.2 is formed adjacent to the second pleat 18.2. The second pleat 18.2 is defined in turn by the region between the second pleat trough 22.2 and a region defining a third pleat trough 22.3, which contains the second pleat crest 20.2. The transition region 24 does not have a pleat peak, but instead transitions downward to the first pleat 22.1.

The positioning ribs 64.1 and 64.2 can be seen in FIG. 11. It can be seen in the illustration in FIG. 12 that there are positioning ribs 64.1 and 64.2 on the undersurface 40 of the connecting region 34 that are not as high as the sealing lips 62.1 to 62.5, and have a wider base. The two grooves 52 and 54 are very shallow. In an alternative example the connecting region 34 can have no grooves 52 and 54, such that the connector seat region surface 38 of the connector seat region 36 is substantially flat between the outer boundary wall 46 and the inner boundary wall 48.

Figure 13A:
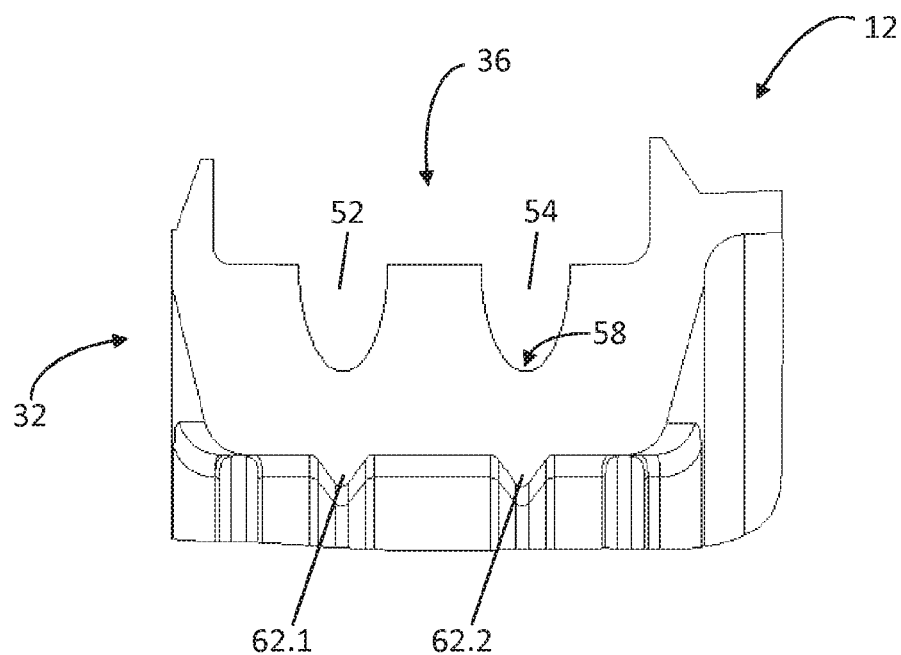
FIG. 13a: shows a cross section through a guide region of a third embodiment of the boot according to the invention.
Figure 13B:
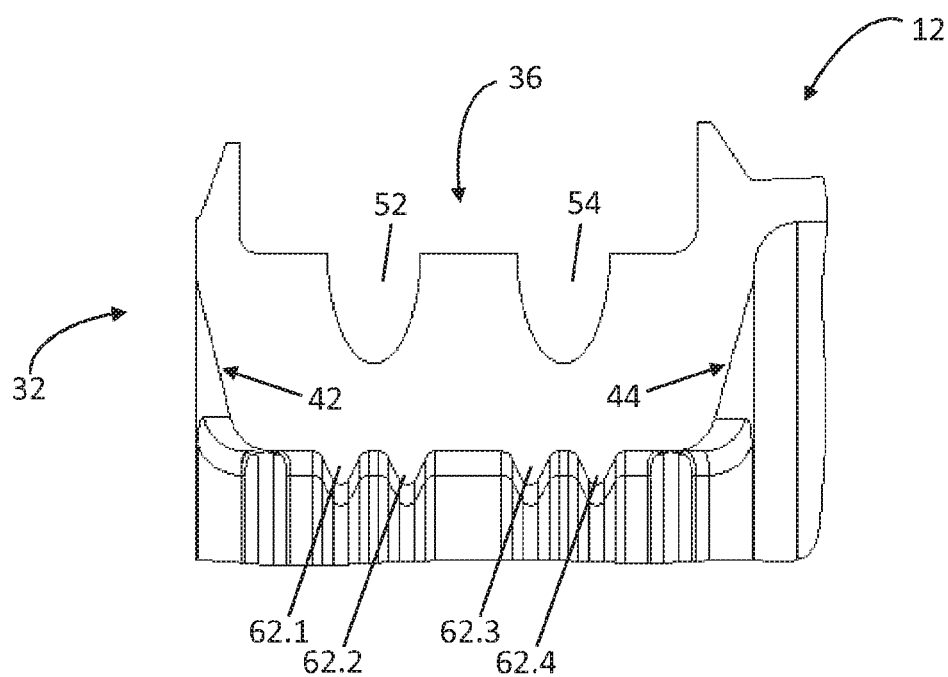
FIG. 13b: shows a cross section through a guide section of a fourth embodiment of the boot according to the invention.

FIG. 13a shows a third example of the boot, which has a guide region 32 and two parallel grooves 52 and 54 with a parabolic cross section, wherein the respective groove bases 58 thereof each have a dedicated sealing lip 62.1 and 62.2. In a fourth example, two parabolic grooves 52 and 54 are formed according to FIG. 13b in the first fastening region 12, in a guide region 32, wherein each of these grooves 52 and 54 have dedicated pairs of sealing lips 62.1, 62.2, and 62.3 and 62.4.

A boot is described herein that can be located in a joint groove of a tri-lobe joint housing with a very good seal, while at the same time providing a good transference of the forces exerted by a connector thereon into a joint housing. In addition, a breaking of the connector is prevented when it is assembled thereon and fastened at a first fastening region of the boot on a joint housing.

The invention claimed is:

1. A boot, comprising:
   a first fastening region, a second fastening region, and a pleated region between the first fastening region and the second fastening region;
   wherein the first fastening region includes connecting regions and at least one of lobe regions or guide regions, and further includes a connector seat region that includes at least two grooves in the lobe regions or the guide regions, starting from the connector seat region surface and, said grooves being parabolic and having depths inside the lobe regions or the guide regions such that each of the grooves has a varying depth inside the lobe regions or the guide regions.

2. The boot according to claim 1, wherein a material of the connector seat region located between the at least two grooves has a thickness $D_a$ at half the depth of the grooves in the lobe regions or the guide regions that corresponds to approximately 85% to 115% of a thickness $D_b$, which is determined between an outer wall or an inner wall of the first fastening region and the respective groove wall of the groove facing it, at half the depth.

3. The boot according to claim 1, wherein there are reinforcing ribs located inside the grooves.

4. The boot according to claim 3, wherein at least one of the reinforcement ribs has a radial orientation.

5. The boot according to claim 3, wherein at least one of the reinforcement ribs is at an angle to a radial orientation of the boot.

6. The boot according to claim 1, wherein the grooves form annular grooves.

7. The boot according to claim 1, wherein a material thickness of the first fastening region is substantially the same underneath the grooves in the lobe regions and/or the guide regions.

8. The boot according to claim 1, wherein there are at least two sealing lips on an undersurface of the first fastening region facing away from the connector seat region surface.

9. The boot according to claim 8, wherein the sealing lips are located substantially beneath the grooves, at least in the lobe regions and/or the guide regions.

10. The boot according to claim 1, wherein there are two positioning ribs in the connecting regions.

11. The boot according to claim 10, wherein at least two sealing lips are located between the two positioning ribs.

12. The boot according to claim 11, wherein the sealing lips and the positioning ribs have different cross section profiles.

13. A joint-shaft connection comprising a boot, the boot including:
- a first fastening region, a second fastening region, and a pleated region between the first fastening region and the second fastening region;
- wherein the first fastening region includes connecting regions and at least one of lobe regions or guide regions, and further includes a connector seat region that includes at least two grooves in the lobe regions or the guide regions, starting from the connector seat region surface and having parabolic cross sections with depths in the lobe regions or the guide regions such that each of the grooves has a varying depth inside the lobe regions or the guide regions.

* * * * *